United States Patent [19]

Greene

[11] Patent Number: 4,811,794

[45] Date of Patent: Mar. 14, 1989

[54] GARDEN TILLER WITH RECIPROCATING TINES

[76] Inventor: Benjamin F. Greene, Rte. 1, Box 52-E, McConnells, S.C. 29726

[21] Appl. No.: 934,152

[22] Filed: Nov. 24, 1986

[51] Int. Cl.$^4$ ............................................. A01B 33/00
[52] U.S. Cl. ......................................... 172/43; 172/84; 172/240
[58] Field of Search ................. 172/3, 19, 20, 38, 41, 172/42, 43, 75, 88, 103, 125, 240, 40, 54.5, 57, 84, 85, 86, 94, 95, 97, 116

[56] References Cited

U.S. PATENT DOCUMENTS

| | | | |
|---|---|---|---|
| 484,394 | 10/1892 | Berthier | 172/54 X |
| 880,457 | 2/1908 | Koszegi | 172/88 |
| 1,224,717 | 5/1917 | Darby et al. | 172/54 |
| 1,413,910 | 4/1922 | Guerra | 172/75 |
| 1,479,188 | 1/1924 | Larson | 172/54 |
| 1,503,626 | 8/1924 | Belsley | 172/54 |
| 1,869,961 | 8/1932 | Glasier | 172/42 |
| 3,111,996 | 11/1963 | Ertsgaard | 172/42 |
| 3,204,704 | 9/1965 | Goette | 172/41 |
| 3,954,143 | 5/1976 | van der Lely | 172/39 |
| 4,096,915 | 6/1978 | Groth | 172/42 |
| 4,111,263 | 9/1978 | van der Lely | 172/54 |
| 4,136,983 | 1/1979 | Dobberpuhl | 172/43 X |
| 4,187,914 | 2/1980 | van der Lely | 172/53 |
| 4,235,294 | 11/1980 | Barlage | 172/48 |
| 4,252,199 | 2/1981 | van der Lely | 172/54 |
| 4,351,396 | 9/1982 | Moulton | 172/40 |
| 4,483,400 | 11/1984 | Arndt | 172/240 X |
| 4,538,400 | 9/1985 | Hottes | 172/75 X |

FOREIGN PATENT DOCUMENTS

| | | | |
|---|---|---|---|
| 79522 | 12/1919 | Austria | 172/84 |
| 241 | 8/1910 | United Kingdom | 172/84 |

Primary Examiner—Richard T. Stouffer
Attorney, Agent, or Firm—Bell, Seltzer, Park & Gibson

[57] ABSTRACT

A garden tilling apparatus has a frame with movable arms extending out of the frame and soil-working tines connected to the forward-most portion of the movable arms. Inside the frame, a crankshaft is mounted coupled to the arms and the arms pivotally attached to the frame. A drive mechanism mounted on top of the frame rotates the crankshaft which in turn reciprocates in an elliptical manner the soil-working tines which engage the soil. Handles extend upwardly from the rear of the frame so that one operator may move and use the apparatus to till the soil.

5 Claims, 3 Drawing Sheets

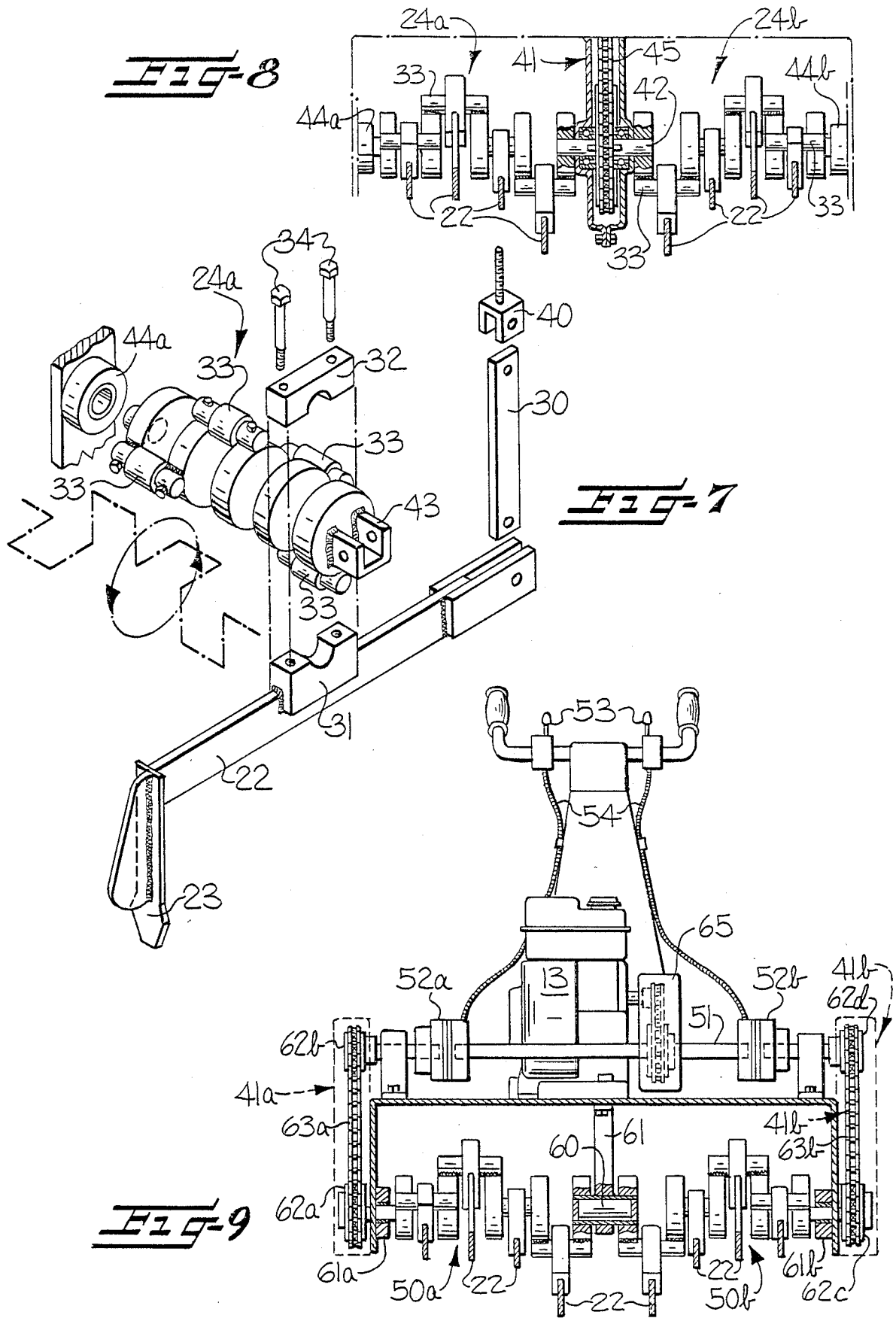

GARDEN TILLER WITH RECIPROCATING TINES

BACKGROUND OF THE INVENTION

This invention relates to an apparatus for tilling the soil, and more particularly to an improved garden tiller.

Most conventional garden tillers have utilized a rotating series of tines for tilling the soil. While this arrangement will satisfactorily break and loosen the soil, weeds and vines tend to become entangled in the rotating tines. This entangles the mechanism and limits its soil penetrating ability. An operator, then, must stop the tiller and manually remove the entrapped weeds and vines.

The present invention, on the other hand, utilizes reciprocating soil-working tines which move in an elliptical fashion. This is advantageous since reciprocating tines can more easily cut weeds and vines, decreasing the likelihood of weed and vine entanglement. A further advantage of the present invention is its utility in tilling close to stationary objects. Since the reciprocating movement of the tines permits a deep penetration at the forward-most portion of the tine's travel, the tiller can be operated near large objects such as rocks or trees. A rotary tiller's depth of penetration at the tine's most forward position is limited.

These advantages are made applicable to this invention by utilizing a crankshaft situated inside the tiller frame, with a protective housing enclosing the frame and crankshaft. Movable arms pivotally linked to the frame are attached to the crankshaft and extend outwardly from the frame and through the housing Soil-working tines are attached to the forward-most portions of the movable arms and extend downwardly to engage the soil. As the crankshaft is rotated, the movable arms reciprocate in an elliptical manner, driving the soil-working tines into engagement with the soil. The protective housing also assists in preventing the accumulation of weeds and vines in the crankshaft and drive mechanism.

While prior inventions have disclosed using a reciprocal, elliptical motion to drive soil-working tines or implements by the use of a crankshaft system, none of the prior art is used in connection with a small garden tiller. Much of the earlier prior art is incorporated and limited to the larger application of self-propelled, powered vehicles. Representative examples include U.S. Pat. Nos. 880,457 to Koszegi and 1,479,188 to Larson.

SUMMARY OF THE INVENTION

This invention is an apparatus for garden tilling which has a tiller frame and a plurality of movable crank arms which extend outwardly from the frame. Soil-working tines are carried by each of the movable arms and extend downwardly from the forward-most portions of the movable arms to contact the soil. A crankshaft is mounted inside the frame and the movable arms are coupled to the crankshaft. When the crankshaft is rotated, the movable arms reciprocate and successively move the soil-working tines into engagement with the soil.

A protective housing may be provided to cover the forward-most portion of the tiller frame to prevent weed and vine entanglement with the internal mechanism. Laterally spaced apart openings in the protective housing allow the movable arms to extend forwardly through the front wall of the housing so as to position the tines for engagement with the soil. The crank arms may be substantially straight along their respective lengths, or some of them may include respective laterally offset front outer end portions thereon supporting the respective tines. The outer end portions of some of the arms also may be offset forwardly and rearwardly with respect to each other so that the tines are likewise offset forwardly and rearwardly of one another.

A further embodiment of the invention includes a side-driven transmission system with crankshafts mounted transversely within the housing. A driveshaft is mounted tranversely on top of the frame with clutches rotatively coupled to the driveshaft. The outer ends of the crankshaft and driveshaft ends extend outwardly beyond the frame with chain drives interconnecting the driveshaft and crankshaft ends. When the clutches are engaged, the motor driven driveshaft rotates the crankshafts. The clutches may be engaged or disengaged to permit only one crankshaft to rotate, which facilitates the steering and control of the invention.

BRIEF DESCRIPTION OF THE DRAWINGS

Some of the features and advantages of the invention having been stated, others will become apparent from the detailed description which follows, and from the accompanying drawings, in which—

FIG. 7 is perspective exploded view showing the coupling between the crankshaft and movable arms of the first form of the invention; and FIG. 8 is a partial sectional view similar to FIG. 3 showing another embodiment of the invention where the crankshafts are integral as an entire unit;

FIG. 9 is a front view partially in section of an alternative form of the invention showing side-driven crankshafts.

DESCRIPTION OF ILLUSTRATIVE EMBODIMENTS

Figures 1, 2:
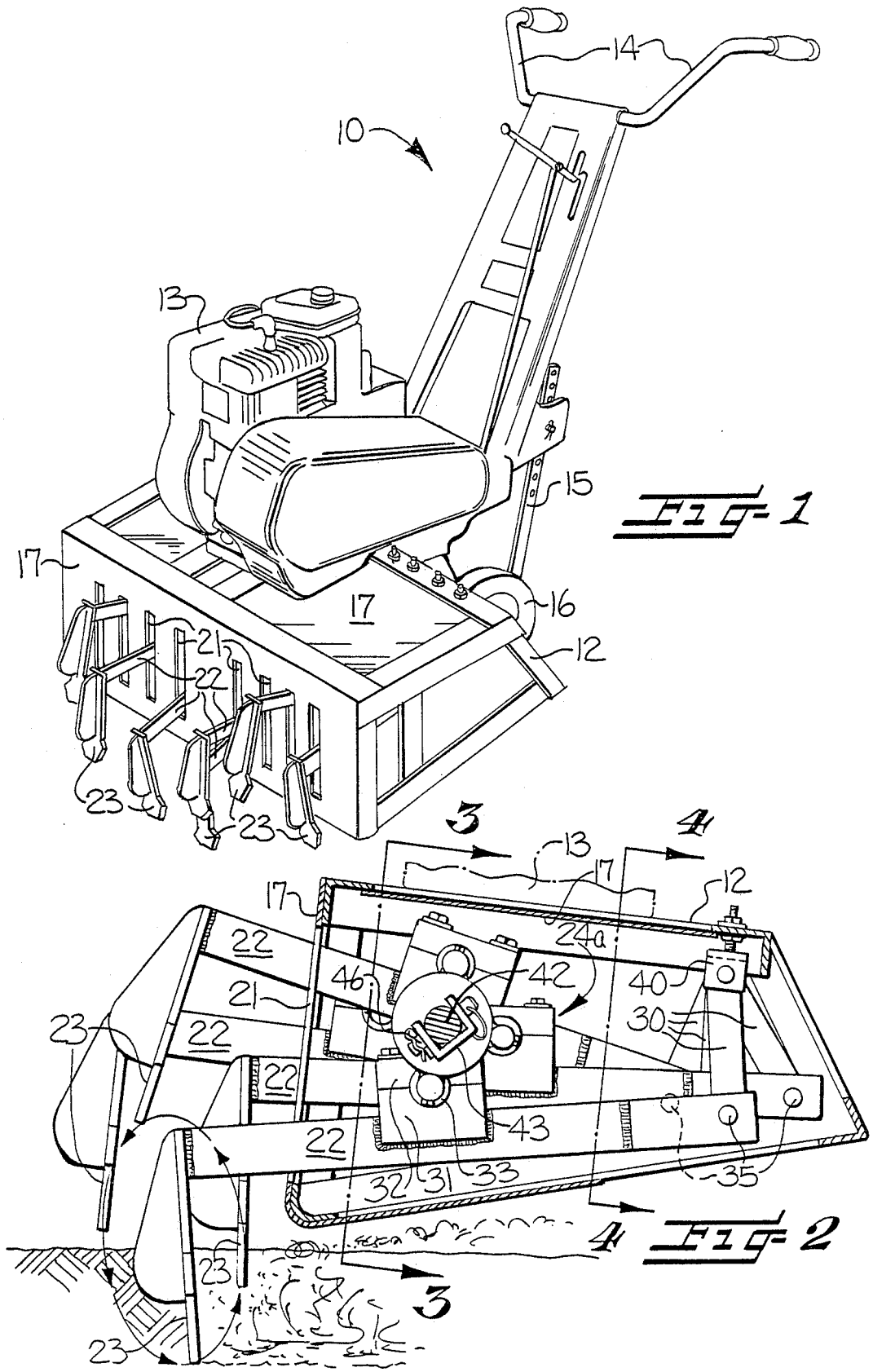
FIG. 1 is a perspective view of a garden tiller in accordance with one embodiment of the invention.
FIG. 2 is a sectional view thereof, and being taken substantially along line 2—2 of FIG. 3.

Referring to FIG. 1, the garden tiller 10 has a frame 12 provided with a motor 13 situated on top of the frame 12, and handles 14 which extend upwardly and rearwardly from the frame 12. A drag bar 15 is secured to the frame 12 via handles 14, and removable wheels 16 are to the frame 12 to facilitate moving the tiller 10 from one location to another. The drag bar 15 is used to stabilize the tiller 10 in the soil during the tilling operation.

A housing 17 covers and is carried by the frame 12. As shown in FIG. 2, the housing 17 substantially encloses the frame 12. Laterally spaced apart vertical openings or slots 21, in the forward wall of housing 17, permit movable arms 22 to extend forwardly and outwardly from the frame 12 and housing 17. Soil-working tines 23 are welded or bolted to the foward-most portions of the movable arms 22 and extend downwardly therefrom to engage the soil. It is apparent from FIG. 2 that in operation, the tines are the only structure extending below the housing 17 forwardly of the rear of the housing.

The movable arms 22 are connected to crankshafts 24a and 24b (FIG. 3) rotatively mounted transversely in the frame 12. At points intermediate the lengths of arms 22, or about midway thereof between the soil-working tines 23 and the opposite ends of the movable arms 22, the arms 22 are pivotally connected to the corresponding crankshafts 24a, 24b in offset relation to the axis thereof. Mounting links 30 are pivotally connected to the rear end portions of the movable arms 22, and the mounting links 30 also are pivotally connected to frame 12 at a location generally above the point of connection thereof to the movable arms 22 (FIGS. 2 and 4). Upon rotation of the crankshafts 24a and 24b, the pivoting motion of the mounting links 30 aids in imparting a substantially vertical reciprocating motion to the movable arms 22 which successively moves said soil-working tines 23 into engagement with the soil.

Referring to FIGS. 2 and 7, the movable arms 22 are shown connected to the crankshafts 24a and 24b at a location generally midway between the opposite ends of the movable arms 22 by coupling means comprising arm caps 31 and bearing caps 32 secured around the crankshaft journals 33 with suitable bearings, e.g. sleeve bearings or bushings, between journals 33 and the caps 31, 32. The arm caps 31 are shown as being welded to the movable arms 22 and the arm caps 31 are suitably secured to the respective bearing caps 32, as by bolts 34 (FIG. 7). The mounting links 30 are pivotally secured to the movable arms 22 by pivot pins 35 and to the frame 12 by brackets 40 (FIGS. 2 and 7).

Figure 3:
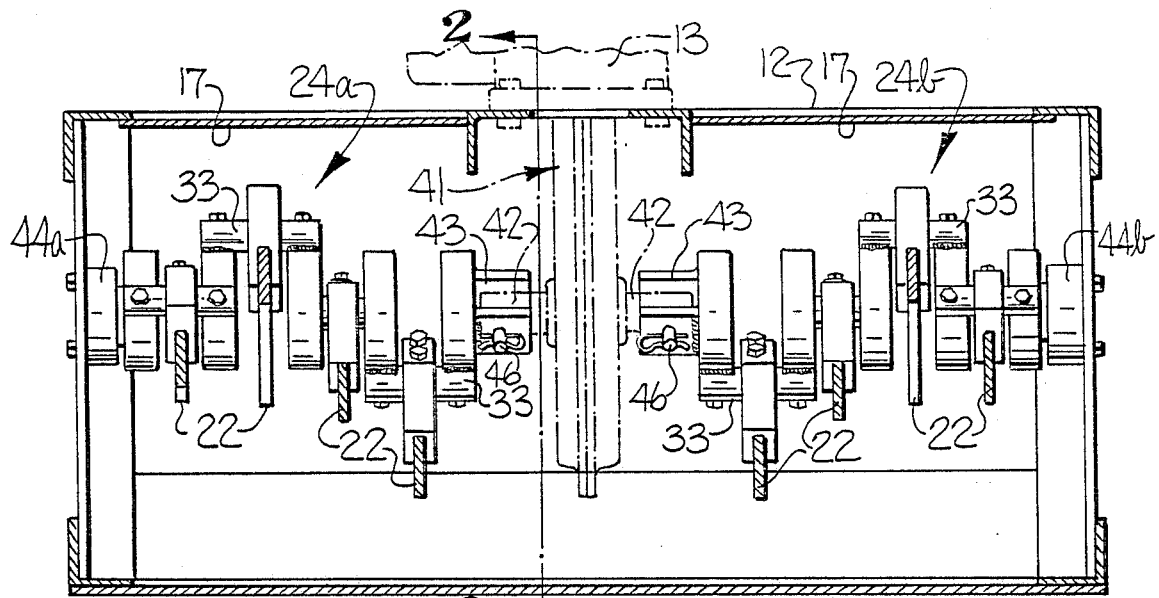
FIG. 3 is a sectional view taken substantially along line 3—3 in FIG. 2.
Figure 4:
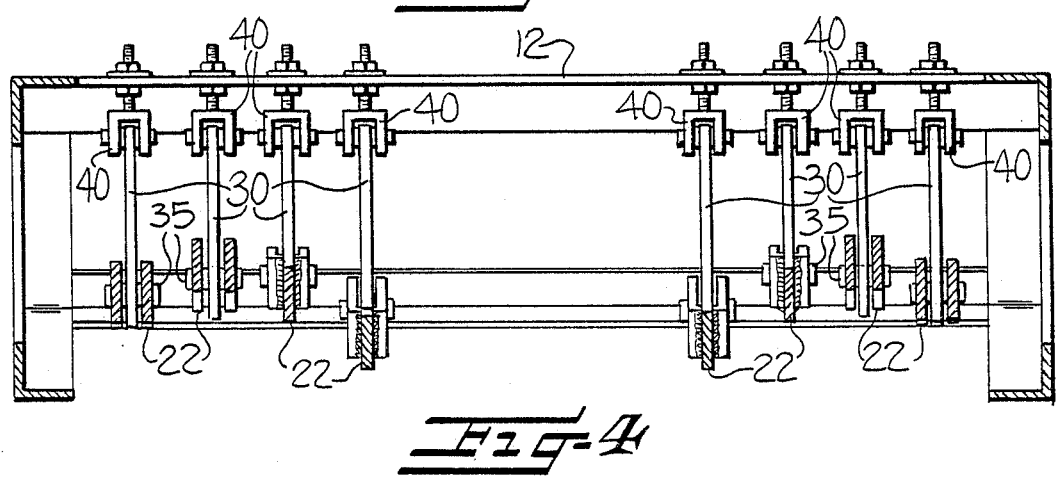
FIG. 4 is a sectional view taken on line 4—4 in FIG. 2.

A center-driven transmission 41 is positioned to rotate the crankshafts 24a and 24b from their proximal ends in FIG. 3. Accordingly, the transmission 41 extends downward in the center of the frame 12 from the motor 13 and has a transmission output shaft 42 to which the inner or proximal ends of the crankshafts 24a and 24b are removably secured, as by brackets 43 and pins 46. Two circular bearing housings 44a and 44b are secured to the sides of the frame with suitable bearings (not shown) inside the bearing housings 44a and 44b to receive the outer or distal crankshaft ends opposite from the bracketed ends thereof. When a chain 45 (FIG. 8) interconnecting the motor 13 and the transmission output shaft 42 rotates the transmission output shaft 42, the crankshafts 24a and 24b also rotate within the bearing housings 44a and 44b.

While the tiller is in operation, the motor 13 rotates the chain 45 and transmission output shaft 42, which rotates the crankshafts 24a and 24b. Since the mounting links 30 are free to swing as the crankshafts 24a and 24b rotate, the movable arms 22, coupled to both the crankshaft journals 33 and the mounting links 30, move in a reciprocating manner with each rotation of the crankshafts 24a and 24b. It should be noted that the journals 33 are arranged in circularly spaced relationship about the rotational axis of the crankshafts. Thus, the effect of the crankshafts' 24a and 24b rotation and resultant pivoting of the mounting links 30 coupled to the movable arms 22 is to impart a reciprocating motion to the movable arms 22 which in turn successively moves the respective soil-working tines in a closed and generally elliptical path to travel (FIG. 2). It is apparent that the elliptical path of travel as shown in FIG. 2 takes place when the tiller 10 is at a standstill.

Figure 5:
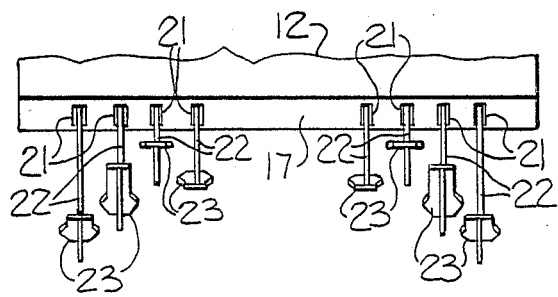
FIG. 5 is a fragmentary plan view of the forward portion of the tiller showing the soil working tines in accordance with one embodiment of the invention.
Figure 6:
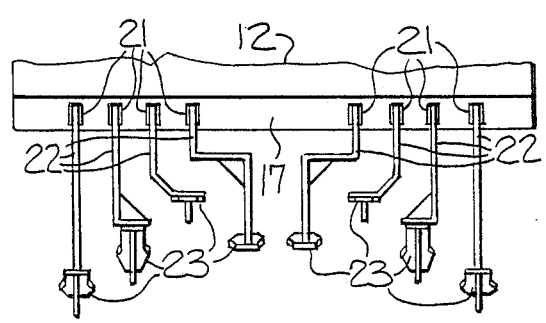
FIG. 6 is a fragmentary plan view of the forward portion of the tiller showing the soil working tines in accordance with a second embodiment of the invention.

In one embodiment of the invention, the movable arms extend straight outwardly from the frame 12 and housing 17 (FIG. 5). In another embodiment of the invention (FIG. 6), the movable arms are offset laterally to compensate for the area displaced by the center-driven transmission system 41.

FIG. 8 shows a different embodiment of the invention where the crankshafts 24a and 24b are placed within the frame 12 as an integral unit. The previous embodiment FIGS. 1-4 and 7) has shown the crankshafts 24a and 24b and the frame 12 attached to a conventional tiller arrangement by the use of brackets 43 and pins 46 which couple the crankshafts 24a and 24b to the transmission output shaft 42 of a conventional tiller. If production models are desired, the proximal ends of crankshafts 24a and 24b may be coupled in a production environment to opposite ends of a transmission output shaft 42 by either a press fit or another suitable means. The crankshafts 24a and 24b, thus integral as an entire unit, permit the proximal or most inward crankshaft journals 33 to be displaced closer together as in FIG. 8.

A different embodiment of the invention using side-driven transmissions 41a and 41b with a clutch system is shown in FIG. 9. Independently rotatable crankshafts 50a and 50b are mounted transversely inside the frame 12, with either or both crankshafts 50a and 50b being driven from a common driveshaft 51 mounted transversely on top of frame 12. Clutch housings 52a and 52b integral with either end of the drive shaft 51 allow the independent engagement and disengagement of each side transmission 41a and 41b.

An advantage of the clutch and side-driven transmission system is the possible selective disengagement of only one or the other of the clutch housings 52a, 52b during the operation of the tiller 10. When a clutch housing is disengaged on one side of the tiller, the crankshaft rotation on that same side is stopped. The other crankshaft may continue to rotate, imparting a reciprocating motion to the movable arms 22 connecting that crankshaft. Because the soil-working tines 23 on only one side of the tiller 10 are then in operation and engage the soil, the tiller 10 moves in an arcuate path. Thus, the selective engagement and disengagement of the clutch housings 52a and 52b act as a steering mechanism for the tiller 10. A convenient method for clutch engagement employes suitable hand controls 53 connected to the clutches 52a, 52b via suitable clutch cables 54.

Instead of the inner ends of the crankshafts 50a and 50b being secured to a transmission output shaft 42 as in the previous embodiment of FIG. 8, the inner ends of the crankshafts 50a and 50b are rotatable on opposite end portions of a rod journal 60 secured to a center post 61 inside the frame 12. The outer ends of the crankshafts 50a and 50b extend outwardly from the sides of the frame 12 and are secured in position by bearing boxes 61a and 61b. Sprockets 62a, 62b, 62c and 62d are secured to the outer ends of the crankshafts 50a and 50b and the ends of driveshaft 51 with chains 63a and 63b interconnecting the driveshaft ends 51 and crankshafts 50a and 50b. When the motor 13 rotates the driveshaft through a transmission 65, and if the clutch housings 52a and 52b are engaged, both crankshafts 50a and 50b rotate. Disengagement of one or both clutch housings 52a and 52b disengages the corresponding side transmission system 41a or 41b and stops the rotation of the corresponding crankshafts 50a or 50b.

It will be understood that the specification and examples are illustrative but not limiting of the present invention, and that other embodiments within the spirit and scope of the invention will suggest themselves to those skilled in the art.

That which I claim is:

1. A manually controlled garden tilling apparatus which comprises a tiller frame, handles carried by and extending rearwardly and upwardly from said frame for facilitating manual guidance and control of the garden tilling apparatus, a plurality of movable arms carried by said frame and extending forwardly therefrom, soil-working tines extending downwardly from the forward-most portion of said movable arms to engage the soil, a crankshaft mounted transversely inside said frame, a protective housing carried by said frame and substantially enclosing said crankshaft and said frame, said protective housing including a series of laterally spaced apart openings, with said movable arms extending respectively outwardly through said openings so as to position said tines for engagement with the soil, said tines being the only structure extending below said housing forwardly of the rear of said housing, a drag bar extending downwardly from the frame and positioned rearwardly of the housing to engage the soil for stabilizing the apparatus, a motor carried by said frame, a transmission interconnecting said motor and said crankshaft to rotate said crankshaft, means for coupling said movable arms to said crankshaft at a location medially of the opposite ends of the arms, and a mounting link pivotally connecting each of said movable arms to said frame, one end of said link being pivotally connected to said frame at a location generally above the point of connection of the link to said arm, and whereby upon rotation of the crankshaft, the soil-working tines are moved in a closed, generally elliptical path of travel to contact the soil.

2. A garden tilling apparatus as claimed in claim 1, in which said arms extend outwardly from said openings in said protective housing in substantially parallel relation to each other.

3. A garden tilling apparatus as claimed in claim 2, in which said arms extend outwardly from said openings in said protective housing with at least some of said arms being offset laterally from others of said arms.

4. A garden tilling apparatus as claimed in claim 1, including removable wheels carried by said frame to facilitate the easy movement of the garden tilling apparatus.

5. A manually controlled garden tilling apparatus which comprises a tiller frame, handles carried by and extending rearwardly and upwardly from said frame for facilitating manual guidance and control of the garden tilling apparatus, a motor carried by said frame, a driveshaft mounted transversely on said frame, means rotatively interconnecting said motor and driveshaft, a pair of coaxial and independently rotatable crankshafts mounted transversely inside said frame with the outer ends of said crankshafts extending outwardly through the frame, transmission means rotatingly interconnecting the outer end of each of said carankshafts with said driveshaft and including respective independently operable clutch means for independent engagement and disengagement of each of said crankshafts, a protective housing carried by said frame and substantially enclosing said crankshafts and said frame, said protective housing including a series of laterally spaced apart openings, a plurality of movable arms extending outwardly from said frame and through said laterally spaced openings, soil-working tines extending downwardly from the forward-most portion of said movable arms so as to position said tines for engagement with the soil, said tines being the only structure extending below said housing forwardly of the rear of said housing, a drag bar extending downwardly from the frame and positioned rearwardly of the housing to engage the soil for stabilizing the apparatus, means for coupling each of said movable arms to said crankshafts at a location medially of the opposite ends of the arms, and a mounting link pivotally connecting each of said movable arms to said frame, one end of said link being pivotally connected to said frame at a location generally above the point of connection of the link to said arm, and whereby upon rotation of the crankshaft, the soil-working tines are moved in a closed, generally elliptical path of travel to contact the soil.

* * * * *